Feb. 23, 1965   HUGH L. DRYDEN   3,170,605
DEPUTY ADMINISTRATOR OF THE NATIONAL
AERONAUTICS AND SPACE ADMINISTRATION
EJECTION UNIT

Filed June 26, 1963   2 Sheets-Sheet 1

INVENTOR.
WILLIAM F. MAC GLASHAN, JR.
BY
ATTORNEYS

INVENTOR.
WILLIAM F. MACGLASHAN, JR.
BY
ATTORNEYS

United States Patent Office 3,170,605
Patented Feb. 23, 1965

3,170,605
EJECTION UNIT
Hugh L. Dryden, Deputy Administrator of the National Aeronautics and Space Administration, with respect to an invention of William F. MacGlashan, Jr.
Filed June 26, 1963, Ser. No. 290,870
4 Claims. (Cl. 222—389)

This invention relates to ejection units, that is, to valves adapted to deliver a precise quantity of fluid with each operation thereof.

Included in the objects of this invention are:

First, to provide an ejection unit which is particularly adapted to deliver a precise quantity of oxidizer or other propellant constituent into a combustion chamber or catalyst bed to initiate a reaction in a rocket motor, so that the operation thereof may be initiated repeatedly and at will by remote or automatic command.

Second, to provide an ejection valve which is automatically operated, and which may be operated by a special pressure fluid or by pressure exerted by another of the propellant fluids, in the latter case minimizing the valves which must function to initiate operation of a rocket motor.

Third, to provide an ejection unit wherein the pressure or motivating fluid and the ejecting fluid are completely isolated so that these fluids may be mutually reactive without adversely affecting operation of the ejection valve.

Fourth, to provide an ejection unit for rocket motors which initially contains the total supply of oxidizer or catalyzing fluid to be discharged in precise quantities a predetermined number of times so that the rocket motor may be restarted at will.

Fifth, to provide an ejection unit which is particularly adapted to effect attitude control and mid-course guidance of space vehicles.

Sixth, to provide an ejection unit which is uniquely suited for use in conjunction with the "Trajectory Correction Propulsion System," which is the subject matter of a copending application, Serial No. 290,867, filed June 26, 1963.

With the above and other objects in view, as may appear hereinafter, reference is directed to the accompanying drawings in which.

Figures 1, 2:
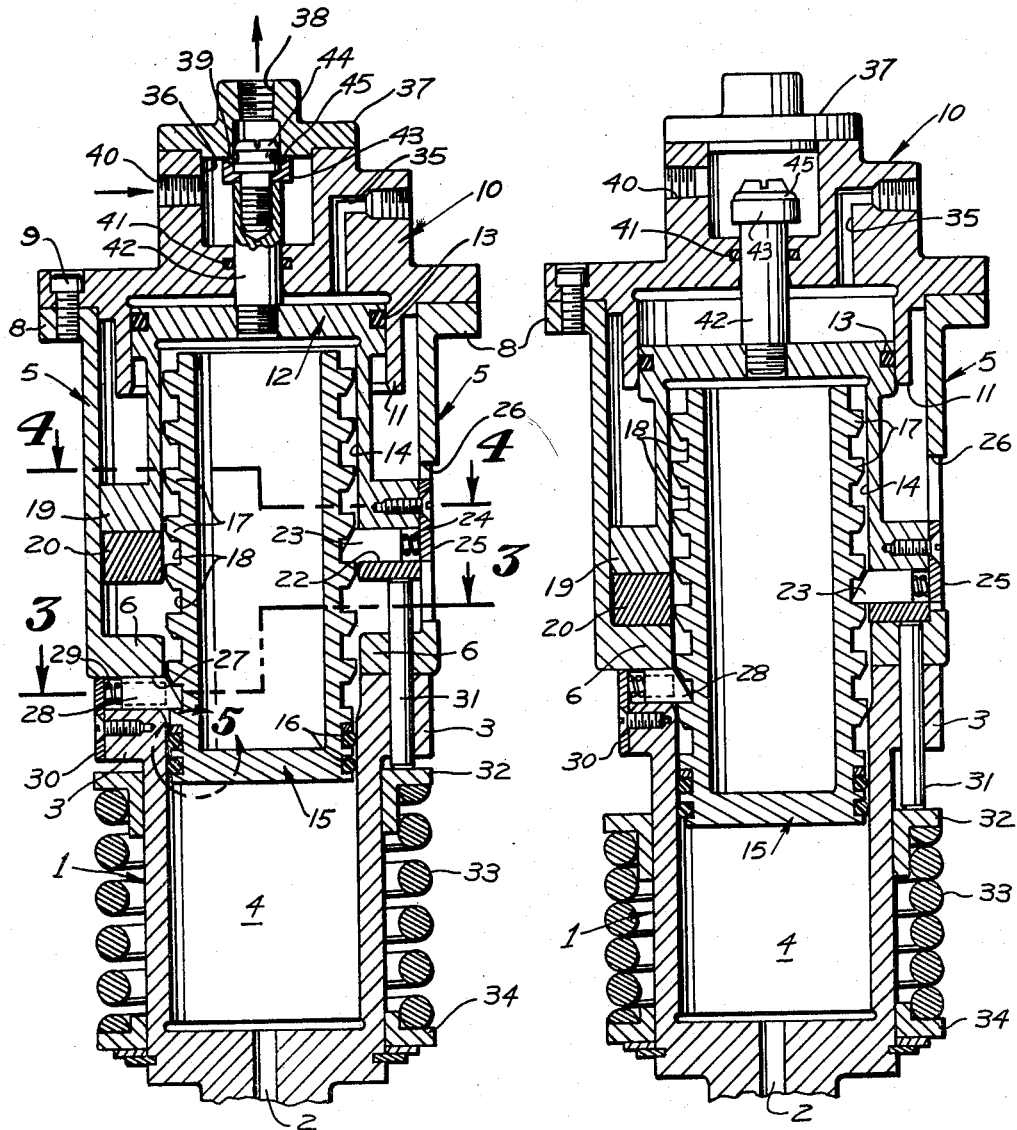
FIGURE 1 is a longitudinal, sectional view of the ejection unit with the operating piston shown in its retracted position.
FIGURE 2 is a similar longitudinal, sectional view with the operating piston shown in its extended position on completion of its first cycle.
Figure 3:
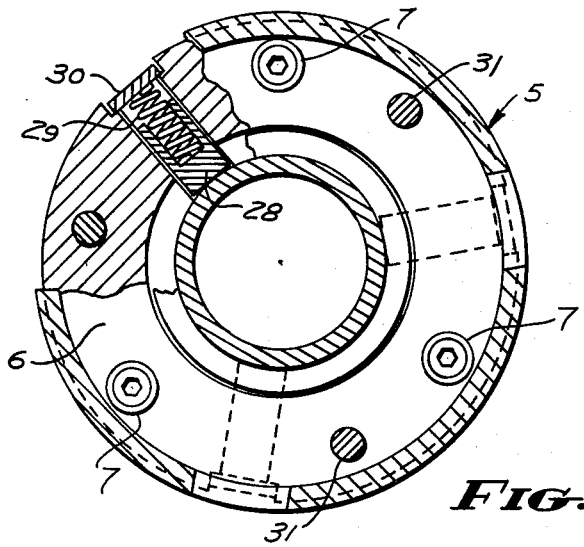
FIGURE 3 is a transverse, sectional view taken through 3—3 of FIGURE 1.
Figure 4:
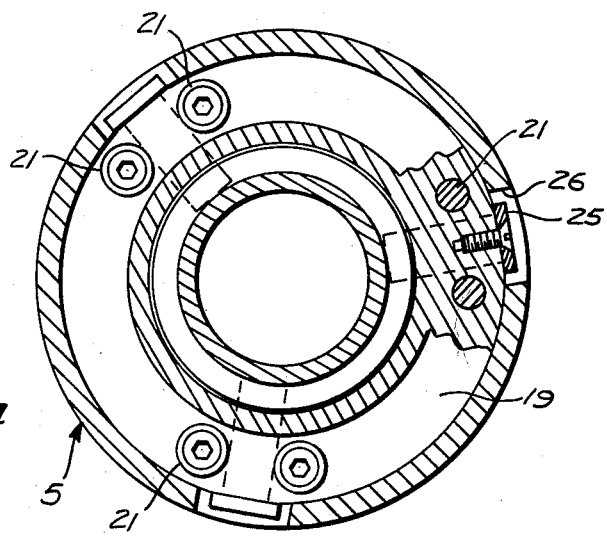
FIGURE 4 is a transverse, sectional view taken through 4—4 of FIGURE 1.

The ejection unit includes a cup-shaped fluid housing or container 1 having a discharge duct 2 in its lower end and provided with an external flange 3 at its upper end. The housing forms a cylindrical fluid chamber 4.

Disposed in coaxial relation with the fluid housing 1 is a cylindrical ejection piston housing 5 having an internal flange 6 at one end overlying the external flanges 3 and secured thereto by bolts 7. The opening through the internal flange 6 is slightly larger than the diameter of the fluid chamber 4.

The remaining end of the ejection piston housing 5 is provided with an external flange 8, to which is secured by bolts 9 a head structure 10. The side of the head structure 10 facing the ejection piston housing 5 is provided with an actuator cylinder 11 of short axial length which projects into the housing 5.

Slidable within the actuator cylinder 11 is an actuator piston 12 having a seal ring 13. The actuator piston 12 extends beyond the cylinder 11 and is provided with a socket 14 which receives one end of an ejection plunger 15.

The ejection plunger 15 is in the form of a hollow cylinder closed at its end remote from the actuator piston 12. The closed end of the ejection plunger 15 extends into the fluid chamber 4 and is provided with seal means 16 to be described hereinafter. Externally, the ejection plunger 15 is provided with a series of annular ratchet teeth 17 forming therebetween annular grooves 18.

The extended end of the actuator piston 12 is provided with an external flange 19 and is covered by a disk 20 secured thereto by screws 21. Formed in the disk 20 or in the external flange 19 is a set of radially extending guide channels 22, each of which receives a latch bar 23.

The radially outer ends of the latch bars 23 are provided with sockets which receive springs 24 held in place by cover plates 25. The walls of the ejection piston housing 5 are provided with axially extending access slots 26 which expose the cover plates 25. The latch bars 23 are adapted to engage the ratchet teeth 17 of the ejection plunger 15.

The external flange 3 of the fluid housing 1 is provided with a set of radially extending guide channels 27, which receive latch bars 28 similar to the latch bars 23. The latch bars 28 are backed by springs 29 held in place by cover plates 30 secured to the radially outer surface of the external flange 3.

The external flange 3 and internal flange 6 are provided with aligned bores which receive axially extending pins 31 engageable with the disk 20. The other ends of the pins 31 project externally of the fluid housing 1, and engage a movable ring 32 backed by a heavy spring 33 surrounding the fluid housing 1.

The spring 33 bears against a fixed ring 34 suitably secured to the extended or closed end of the fluid housing 1, the spring 33 acting through the pins 31 to urge the actuator piston 12 toward its retracted position shown in FIGURE 1.

The head structure 10 is provided at one side with a pressure fluid inlet duct 35, communicating with the closed end of the actuator cylinder 11. The outer end of the head structure 10 is provided with a valve chamber 36 covered by a cap 37 having a central outlet bore 38, and forming a valve seat 39 facing into the chamber 36. The chamber 36 is provided with a side inlet 40.

The valve chamber 36 communicates with the actuator cylinder 11 through a bore having a seal ring 41, which receives a stem 42 secured to the actuator piston 12. The extended end of the stem 42 is provided with a head 43 and retainer screw 44 which secure a valve ring 45 for engagement with the valve seat 39. The head 43 also serves as a stop to limit movement of the actuator piston 12.

Operation of the ejection unit is as follows:

The ejection unit is intended to deliver precise quantities of fuel constituent, or the like, to a rocket motor. For example, the chamber 36 may contain an oxidizer intended to be injected into a combustion chamber or catalyst bed simultaneously with the injection of a monopropellant or the like, so that operation of the rocket motor may be initiated. Only a relatively small amount of oxidizer need be provided; for once the monopropellant is ignited, the rocket motor will function as long as the monopropellant is supplied.

The ejection unit not only is intended to deliver a predetermined quantity of oxidizer, but also to control the flow of the monopropellant or the like. When it is desired to initiate operation of the rocket motor, air or other pressure fluid is applied through the inlet 35 so as to drive the actuator piston 12 from the position shown in FIGURE 1 to the position shown in FIGURE 2. In doing so, the plunger 15 is driven into the fluid chamber 4 by reason of engagement of the latch bars 23 with the ratchet teeth 17. This forward movement terminates on engagement of the disk 20 with the internal flanges 6, shown in FIGURE 2.

Simultaneously with movement of the actuator piston 12, the valve formed by the valve ring 45 and its seat 39 is opened to permit flow of the monopropellant or other fuel constituent. The flow of the fuel constituent continues as long as the actuator piston 12 is held in the position shown in FIGURE 2. However, only the volume of oxidizer or the like determined by the movement of the plunger 15 is discharged.

When it is desired to terminate operation of the rocket motor, the pressure fluid inlet duct 35 is vented, permitting the spring 33 to return the actuator piston 12 to the position shown in FIGURE 1. The plunger 15, however, is prevented from returning by the latch bars 28.

The latch bars 23 move past one or more ratchet teeth 17 on return movement of the actuator piston 12, so that, on subsequent movement of the actuator piston 12, the plunger 15 is moved a predetermined further distance into the fluid chamber 4, to discharge a predetermined further quantity of oxidizer or the like.

Figure 5:
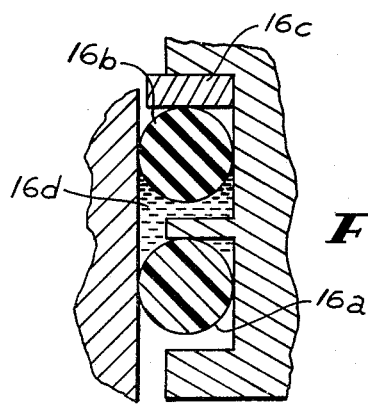
FIGURE 5 is an enlarged, fragmentary view of the seal means taken within circle 5 of FIGURE 1.

Reference is directed particularly to FIGURE 5 which illustrates in detail the sealing means 16. The sealing means 16 includes a bottom O-ring 16a, preferably formed of polytetrafluoroethylene, and an upper O-ring 16b formed of an elastomer backed at its upper side by a Teflon ring 16c which is dimensioned to have a running fit within the walls of the fluid chamber 4. The space between the O-rings 16a and 16b is filled with a silicone grease compatible with the oxidizer, such as nitrogen tetroxide ($N_2O_4$). The lowermost O-ring insures an excellent slide bearing surface. The grease 16d forms, in effect, a fluid barrier between the oxidizer and the upper or sealing O-ring 16b. In particular, the seal thus formed fully prevents leakage so that the oxidizer may remain sealed within its chamber for long periods of time without danger of loss. Thus the ejection valve may, initially, remain inactive for many months or even years, and when needed may be depended upon to function and deliver the prescribed quantity of oxidizer.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. An ejection unit, comprising:
   (a) an injection fluid housing;
   (b) a plunger movable therein to eject the contents thereof;
   (c) an actuator piston and cylinder means disposed in coxial relation to said plunger, said piston and cylinder means having a predetermined stroke less than the travel of said plunger;
   (d) a first mechanical means interposed between said piston and cylinder means and said plunger to move said plunger a predetermined distance;
   (e) and a second mechanical means for locking said plunger against return movement from a previous position to which said plunger is moved by said piston and cylinder means, whereby, on repeated operation of said piston and cylinder means, said plunger is advanced in said fluid housing to eject predetermined quantities of fluid therefrom.

2. An ejection unit, comprising:
   (a) an ejection fluid housing;
   (b) a plunger movable therein to eject the contents thereof;
   (c) an ejection piston housing continuing from said fluid housing and surrounding said plunger;
   (d) a head structure capping said ejection piston housing and including a cylinder;
   (e) a piston for said cylinder including a socket to receive said plunger;
   (f) a first means carried by said piston for urging said plunger into said fluid housing to eject a predetermined quantity of fluid therefrom;
   (g) and a second means for securing said plunger against return movement, whereby, on succeeding operations of said piston, said plunger is advanced in said fluid housing to eject succeeding quantities of fluid therefrom.

3. An ejection unit, comprising:
   (a) an ejection fluid housing;
   (b) a plunger movable therein to eject the contents thereof, said plunger including a plurality of axially distributed ratchet teeth;
   (c) an actuator piston and cylinder means having a predetermined stroke less than the travel of said plunger;
   (d) a first latch means interposed between said piston and cylinder means and said ratchet teeth to move said plunger a predetermined distance;
   (e) and a second latch means for securing said plunger against return movement from a previous position to which said plunger is moved, whereby, on repeated operation of said piston and cylinder means, said plunger is advanced in said fluid housing to eject predetermined quantities of fluid therefrom.

4. An ejection unit, comprising:
   (a) an ejection fluid housing;
   (b) a plunger movable therein to eject the contents thereof, said plunger including a plurality of axially distributed ratchet teeth;
   (c) an ejection piston housing continuing from said fluid housing and surrounding said plunger;
   (d) a head structure capping said ejection piston housing and including a cylinder;
   (e) a piston for said cylinder including a socket to receive said plunger;
   (f) a first latch means carried by said piston and engageable with said ratchet teeth to urge said plunger into said fluid housing a predetermined distance, thereby to eject a predetermined quantity of fluid therefrom;
   (g) and a second latch means interposed between said fluid housing and said plunger to restrain said plunger against return movement, whereby, on succeeding operations of said piston, said plunger is advanced in said fluid housing to eject succeeding quantities of fluid therefrom.

References Cited by the Examiner

UNITED STATES PATENTS

| | | | |
|---|---|---|---|
| 2,563,636 | 8/51 | Ballard | 222—389 |
| 2,605,763 | 8/52 | Smoot | 222—327 X |

SAMUEL F. COLEMAN, *Primary Examiner.*

LOUIS J. DEMBO, *Examiner.*